(12) United States Patent
Zhang et al.

(10) Patent No.: US 8,491,320 B2
(45) Date of Patent: Jul. 23, 2013

(54) PORTABLE ELECTRONIC DEVICE WITH CHIP CARD EJECTING MECHANISM

(75) Inventors: Shi-Hua Zhang, Shenzhen (CN); Jin-Feng Gao, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/453,153

(22) Filed: Apr. 23, 2012

(65) Prior Publication Data

US 2013/0164958 A1 Jun. 27, 2013

(30) Foreign Application Priority Data

Dec. 27, 2011 (CN) .......................... 2011 1 0444175

(51) Int. Cl.
*H01R 13/62* (2006.01)
(52) U.S. Cl.
USPC .......................................... 439/159; 439/304
(58) Field of Classification Search
USPC ................ 439/157, 159, 138, 142, 131, 372, 439/304
See application file for complete search history.

(56) References Cited

U.S. PATENT DOCUMENTS

| | | | | |
|---|---|---|---|---|
| 4,590,943 A * | 5/1986 | Paull et al. ........................ 607/5 |
| 4,688,131 A * | 8/1987 | Noda et al. ..................... 360/137 |
| 4,940,414 A * | 7/1990 | Lee ................................ 439/131 |
| 4,979,909 A * | 12/1990 | Andrews ....................... 439/352 |
| 5,155,663 A * | 10/1992 | Harase ..................... 361/679.31 |
| 5,233,674 A * | 8/1993 | Vladic .............................. 385/56 |
| 5,350,317 A * | 9/1994 | Weaver et al. ................ 439/500 |
| 5,559,672 A * | 9/1996 | Buras et al. ............. 361/679.32 |
| 5,601,939 A * | 2/1997 | Zander ............................ 429/98 |
| 5,655,917 A * | 8/1997 | Kaneshige et al. ........... 439/155 |
| 5,688,134 A * | 11/1997 | Hirata ............................ 439/136 |
| 5,691,860 A * | 11/1997 | Hoppe ........................ 360/99.13 |
| 5,882,220 A * | 3/1999 | Horii et al. .................... 439/297 |
| 5,984,705 A * | 11/1999 | Miyazaki et al. ............. 439/304 |
| 6,251,073 B1 * | 6/2001 | Imran et al. ................... 600/443 |
| 6,377,451 B1 * | 4/2002 | Furuya ..................... 361/679.32 |
| 6,438,229 B1 * | 8/2002 | Overy et al. ................... 379/446 |
| 6,824,416 B2 * | 11/2004 | Di Mascio .................... 439/352 |
| 6,851,867 B2 * | 2/2005 | Pang et al. ....................... 385/88 |
| 6,862,175 B1 * | 3/2005 | McClendon et al. ..... 361/679.31 |
| 7,040,911 B1 * | 5/2006 | Ho et al. ........................ 439/352 |
| 7,077,578 B2 * | 7/2006 | Lee et al. ......................... 385/88 |
| 7,090,523 B2 * | 8/2006 | Shirk et al. .................... 439/352 |
| 7,402,070 B1 * | 7/2008 | Wu ................................ 439/352 |
| 7,470,139 B2 * | 12/2008 | Miki et al. ..................... 439/354 |

(Continued)

*Primary Examiner* — Neil Abrams
*Assistant Examiner* — Phuongchi T Nguyen
(74) *Attorney, Agent, or Firm* — Altis Law Group, Inc.

(57) ABSTRACT

A chip card ejecting mechanism includes a main body, a tray slidably fixed to the main body, a latching element, a first elastic member and a second elastic member. The tray defines a latching groove. The latching element includes latching board, a latching block protruding from the latching board, and a triggering member rotatably fixed to the main body. The first elastic member is resisted between the latching board and the main body, to make the latching block latch with the latching groove. The second elastic member is fixed to the main body and is compressed by the tray. After the triggering member rotates relative to the main body to release the latching block from the latching groove, the second elastic member decompresses to drive the tray out of the main body.

20 Claims, 5 Drawing Sheets

U.S. PATENT DOCUMENTS

| | | | |
|---|---|---|---|
| 7,507,103 B1 * | 3/2009 | Phillips et al. | 439/352 |
| 8,040,687 B2 * | 10/2011 | Pirillis | 361/801 |
| 2001/0036770 A1 * | 11/2001 | Saito et al. | 439/630 |
| 2006/0078259 A1 * | 4/2006 | Fuchs | 385/88 |

* cited by examiner

PORTABLE ELECTRONIC DEVICE WITH CHIP CARD EJECTING MECHANISM

BACKGROUND

1. Technical Field

The present disclosure relates to portable electronic devices, and particularly to portable electronic devices with a chip card ejecting mechanism.

2. Description of Related Art

Many portable electronic devices such as mobile phones include a chip card holder for holding the chip card.

Many chip card holders define a receiving groove for receiving a chip card. The chip card is partly received in the receiving groove to be electronically connected to a circuit of the device employing the chip card, and partly exposed so that it may be gripped for removal. However, the exposed part of the chip card is usually small and therefore difficult for a user to grasp.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary chip card ejecting mechanism and portable electronic device using the chip card ejecting mechanisms. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
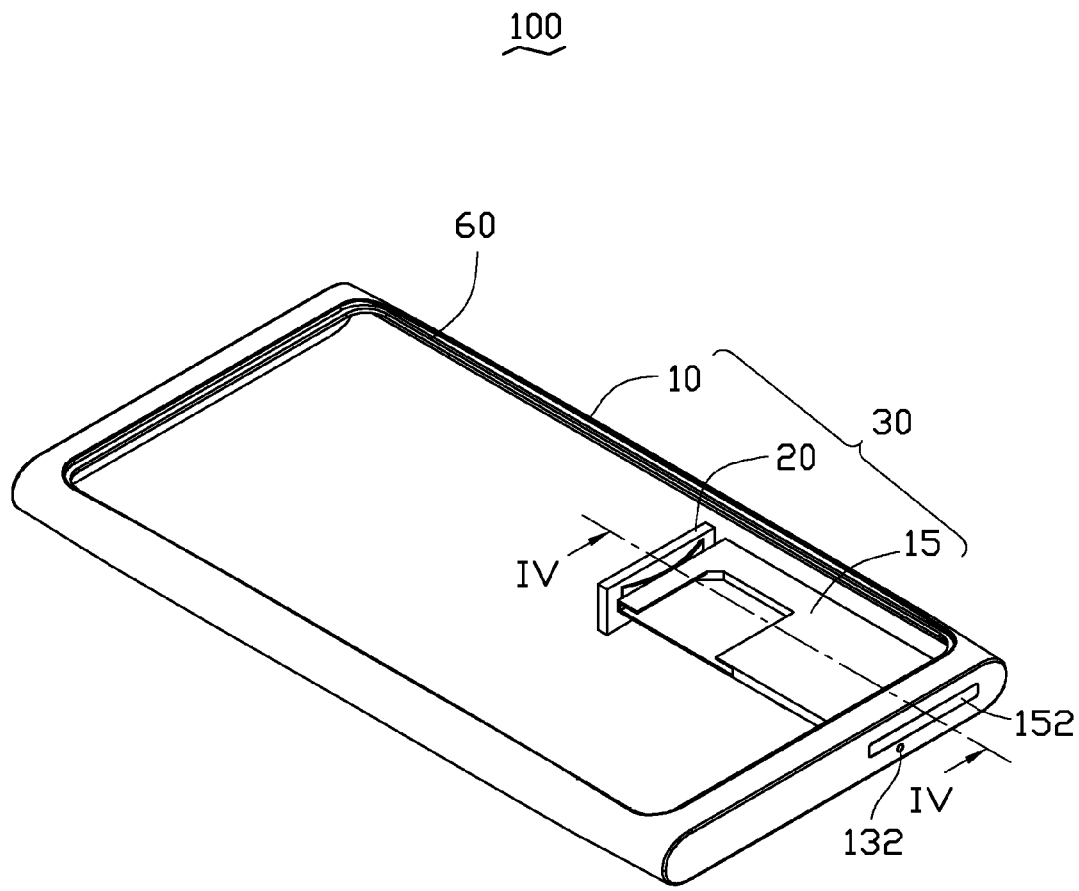
FIG. 1 is a view of one embodiment of a chip card ejecting mechanism as used in a portable electronic device, the portable electronic device including a housing, a chip card and a chip card ejecting mechanism.
Figure 2:
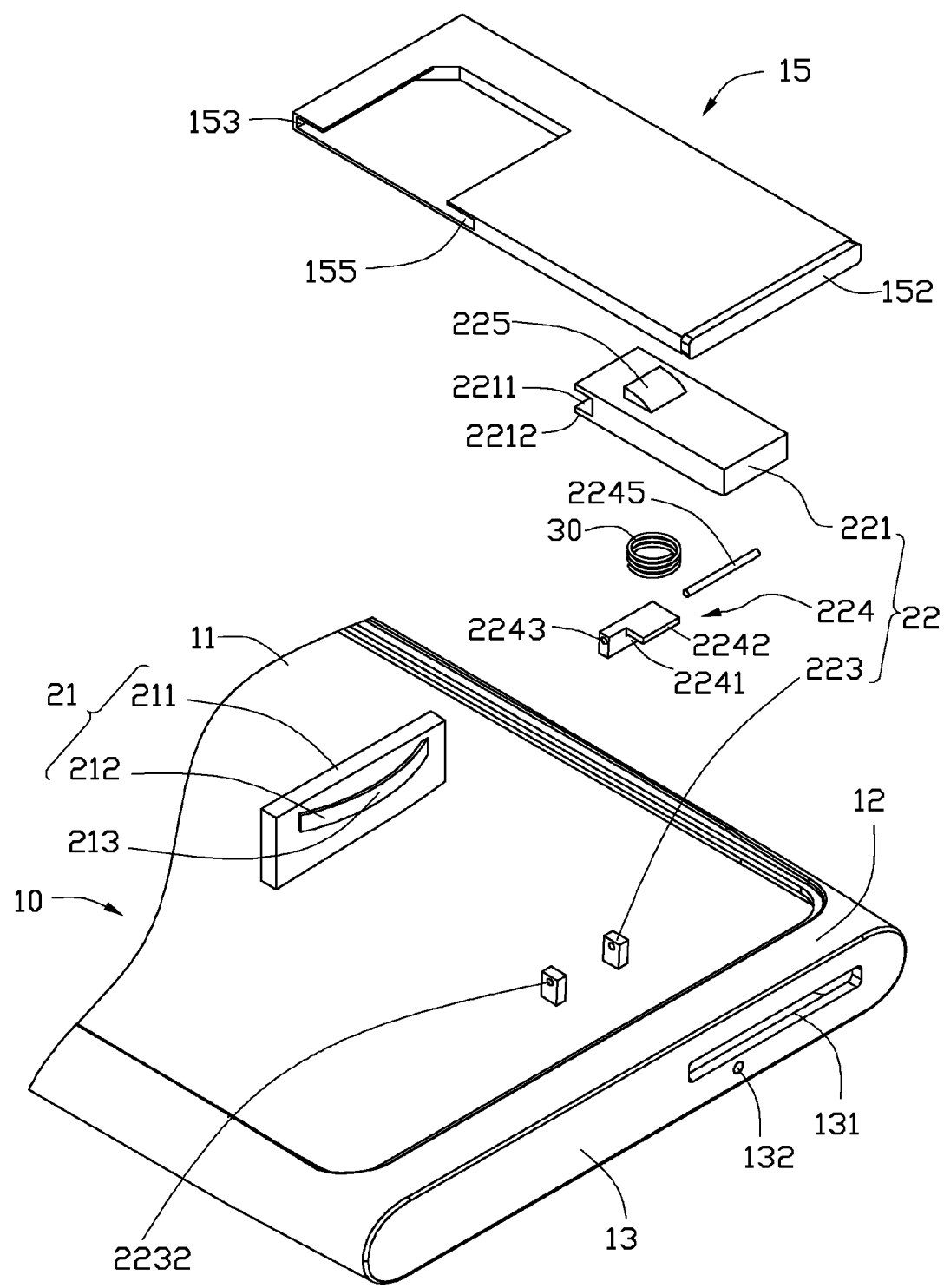
FIG. 2 is an exploded and partially enlarged view of the portable electronic device of FIG. 1.

FIGS. 1 and 2, show an embodiment of a chip card ejecting mechanism 30 which can be used on a portable electronic device 100, such as a cellular phone or any electronic device where a chip card is required. The portable electronic device 100 includes a housing 60 and the chip card ejecting mechanism 30 mounted to the housing 60. The chip card ejecting mechanism 30 holds a chip card (not shown) in the housing 60.

The chip card ejecting mechanism 30 includes a main body 10, a tray 15 and a control assembly 20. In this exemplary embodiment, the main body 10 is a part of the housing 60, and includes a main board 11 and a sidewall 13 protruding from the main board 11. An opening 131 and a triggering hole 132 are both defined through the sidewall 13. The chip card ejecting mechanism 30 ejects the chip card out of the housing 60 through the opening 131.

Figure 3:
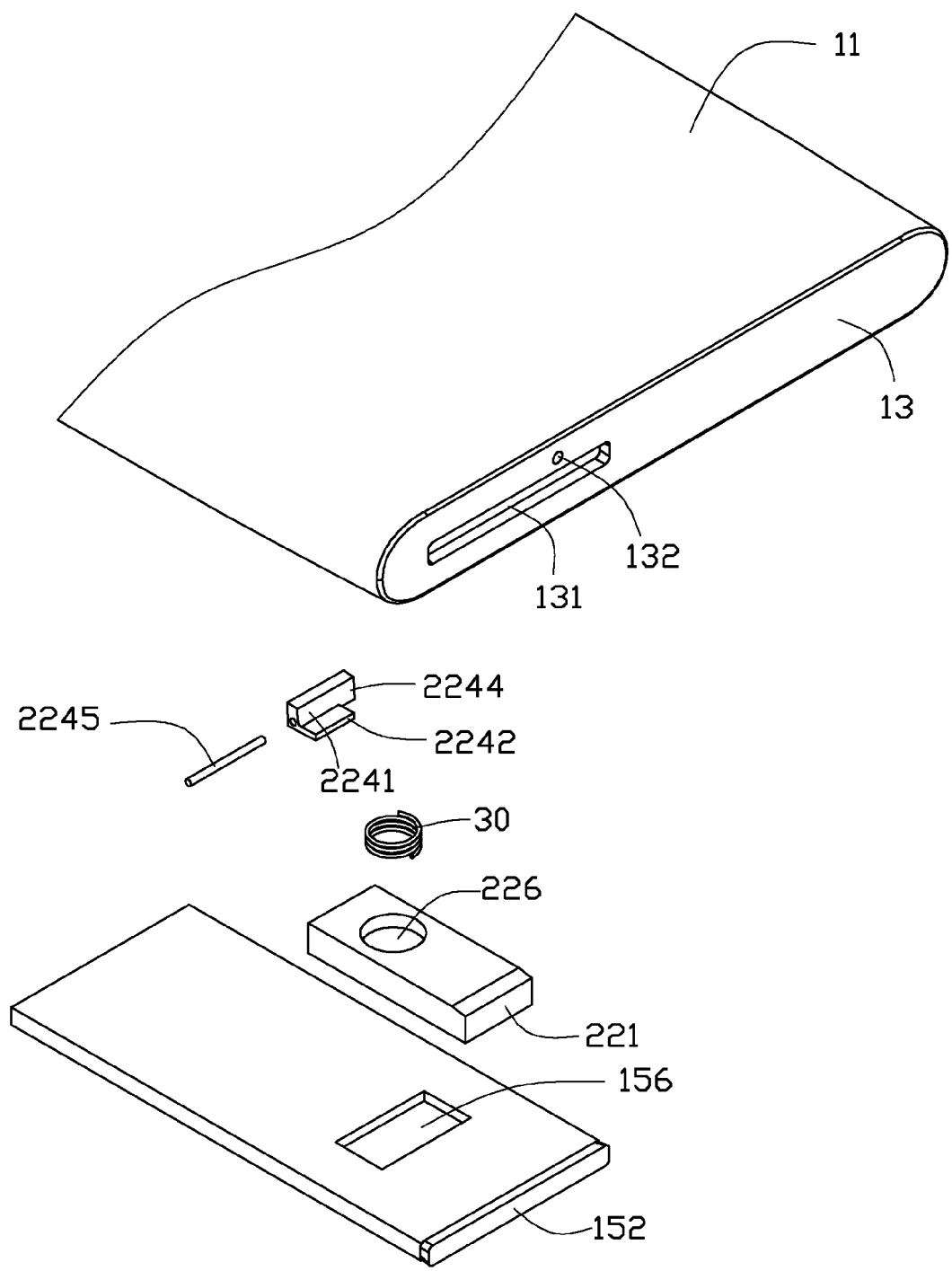
FIG. 3 is similar to FIG. 2, but viewed from anther aspect.

Referring also to FIG. 3, the tray 15 includes a first end 152 and a second end 153 opposite to the first end 152. A latching groove 156 is defined in the tray 15 adjacent to the first end 152. A receiving groove 155 is defined in the tray 15 adjacent to the second end 153, in which the chip card is received.

The control assembly 20 includes an ejecting element 21, a latching element 22 and a first elastic member 30.

The ejecting element 21 includes a mounting board 211 and a second elastic member 212. The mounting board 211 is fixed to the main board 11 and aligned with the opening 131. The second elastic member 212 is arcuate and is fixed to a surface of the mounting board 211 facing the opening 131. The second elastic member 212 includes an ejecting point 213 at its center.

The latching element 22 includes a latching board 221, two fixing blocks 223 and a triggering member 224.

The latching board 221 includes a cutout 2211 defined at one end of the latching board 221, and a resisting wall 2212 formed at a bottom of the cutout 2211. The latching board 221 further includes a latching block 225 protruding from a top surface of the latching board 221, and defines a slot 226 in another surface of the latching board 221 opposite to the latching block 225. The latching block 225 is latched with the latching groove 156 to prevent the tray 15 from sliding out of the opening 131.

The fixing blocks 223 protrude from the main board 11 and are located between the sidewall 13 and the mounting board 211. Each fixing block 223 defines a first shaft hole 2232.

The triggering member 224 is substantially L-shaped, includes a main section 2241 and a side section 2242 protruding from the main section 2241. A second shaft hole 2243 is defined through the main section 2241. A shaft 2245 is retained in the second shaft hole 2243 and rotatably extends into the first shaft hole 2232 so the triggering member 224 is assembled to the main board 11 and may rotate relative to the main board 11 about the shaft 2245. The side section 2242 is located in the cutout 2211 and resists against the resisting wall 2212 of the latching board 221.

The first elastic member 30 exerts an elastic force to the latching board 221 to make the latching block 225 latch in the latching groove 156. In this exemplary embodiment, the first elastic member 30 is a compressed coil, one end of the first elastic member 30 is received in the slot 226, and the other end of the first elastic member 30 resists against the main board 11.

Figure 4:
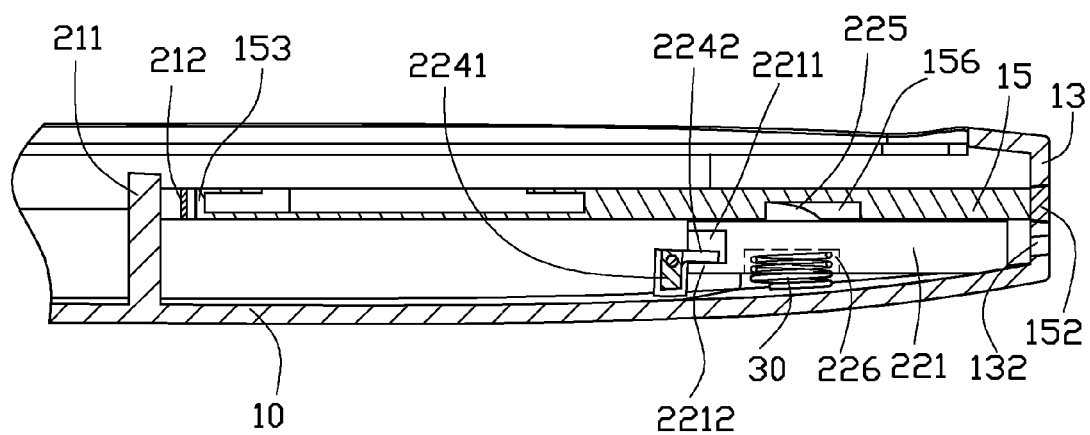
FIG. 4 is a cross sectional view along the line of IV-IV in FIG. 1.

Preferring also to FIG. 4, in assembly, the first elastic member 30 is received in the slot 226. The latching board 221 is fixed (e.g., hot-melted) to the sidewall 13 and aligned with the triggering hole 132 so the first elastic member 30 is located between the latching board 221 and the main board 11. The first shaft hole 2232 is aligned with the second shaft hole 2243. The shaft 2245 passes through the first shaft hole 2232 and the second shaft hole 2243 so the triggering member 224 is rotatably fixed to the fixing blocks 223. Hence, the side section 2242 is located in the cutout 2211 and resists against the resisting wall 2212. The ejecting element 21 is fixed to the main board 11. The tray 15 is inserted into the main body 10 from the opening 131 until the second end 153 compresses the ejecting point 213 and the latching block 225 is latched in the latching groove 156. Then, the second elastic member 212 is compressed, the first end 152 is located in the opening 131 to improve the exterior appearance of the housing 60.

Figure 5:
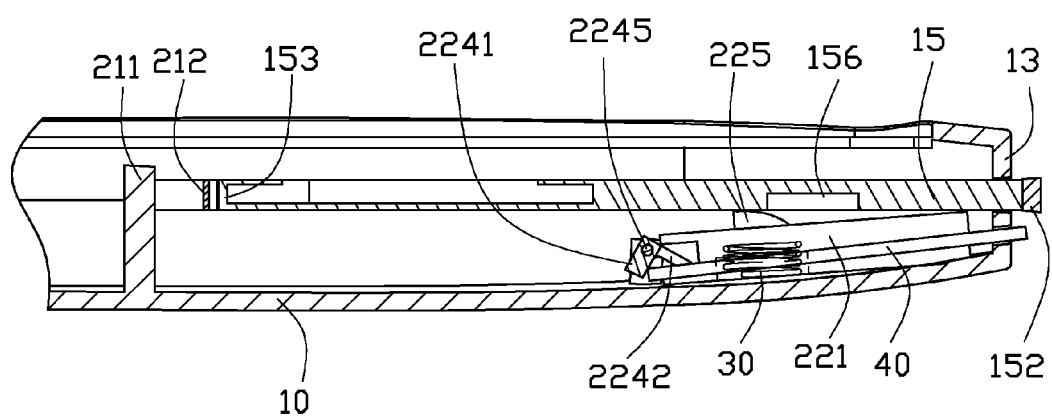
FIG. 5 is similar to FIG. 4, but the chip card is ejected out of the housing.

FIGS. 4 and 5 show the mechanism in use, a pin 40 is manually inserted into the triggering hole 132 or pushed further into the triggering hole 132, which drives the triggering member 224 to rotate about the shaft 2245 so the side section 2242 can drive the resisting wall 2212 and the latching board 221 move away from the tray 15 until the latching block 225 is released from the latching groove 156. The first elastic member 30 is thus further compressed. As the latching block 225 is released from the latching groove 156, the second elastic member 212 decompresses to drive the tray 15 away from the ejecting element 21 until the first end 152 of the tray 15 comes out of the opening 131. Then, the tray 15 may very easily be pulled out of the opening 131 manually. The chip card is put in the receiving groove 155 of the tray 15. After that, the tray 15 is inserted into the main body 10 from the opening 131 until the second end 153 compresses the ejecting point 213 and the latching block 225 is again latched in the latching groove 156. Thus, the chip card is mounted in the housing 60.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A chip card ejecting mechanism comprising:
a main body;
a tray slidably fixed to the main body, the tray defining a latching groove;
a latching element including a latching board, a latching block protruding from the latching board, and a triggering member rotatably fixed to the main body;
a first elastic member being resisted between the latching board and the main body, to make the latching block be latched with the latching groove;
a second elastic member being fixed to the main body and being compressed by the tray;
wherein after the triggering member rotates relative to the main body to release the latching block from the latching groove, the second elastic member decompresses to drive the tray out of the main body.

2. The chip card ejecting mechanism of claim 1, wherein the latching block protrudes from a surface of the latching board, a slot is defined in another surface of the latching board opposite to the latching block; one end of the first elastic member is received in the slot, and the other end of the first elastic member resists the main body.

3. The chip card ejecting mechanism of claim 1, wherein a mounting board is fixed to the main board and aligned with the opening; the second elastic member is arcuate and is fixed to a surface of the mounting board facing the opening.

4. The chip card ejecting mechanism of claim 1, wherein a cutout is defined at one end of the latching board, in which a resisting wall is formed; the triggering member comprises a main section rotatably fixed to the main body and a side section protruding from the main section, the side section is located in the cutout and resists against the resisting wall.

5. The chip card ejecting mechanism of claim 4, wherein the main body comprises a main board and a sidewall protruding from the main board, an opening is defined through the sidewall; and the second elastic member drives the tray out of the main body through the opening.

6. The chip card ejecting mechanism of claim 5, wherein two fixing blocks protrude from the main board and located between the sidewall and the mounting board, each fixing block defines a first shaft hole; a second shaft hole is defined through the main section; a shaft is retained in the second shaft hole and rotatably extending into the first shaft hole, enabling the triggering member rotating relative to the main board about the shaft.

7. The chip card ejecting mechanism of claim 6, wherein a triggering hole is defined through the sidewall, a pin is inserted into the triggering hole to drive the triggering member to rotate about the shaft so the side section drives the resisting wall and the latching board to move away from the tray, making the latching block is released from the latching groove.

8. A portable electronic device comprising:
a housing defining an opening;
a tray slidably fixed to the housing, the tray defining a latching groove;
a latching element comprising a latching board, a latching block protruding from the latching board, and a triggering member rotatably fixed to the housing;
a first elastic member exerting a first elastic force to the latching board, causing the latching block being latched with the latching groove to prevent the tray from sliding out of the opening;
a second elastic member exerting a second elastic force to the tray to drive the tray out of the opening.

9. The portable electronic device of claim 8, wherein the latching block protrudes from a surface of the latching board, a slot is defined in another surface of the latching board opposite to the latching block; one end of the first elastic member is received in the slot, and the other end of the first elastic member resists the housing.

10. The portable electronic device of claim 8, wherein a mounting board is fixed to the main board and aligned with the opening; the second elastic member is arcuate and is fixed to a surface of the mounting board facing the opening.

11. The portable electronic device of claim 8, wherein a cutout is defined at one end of the latching board, in which a resisting wall is formed; the triggering member comprises a main section rotatably fixed to the housing and a side section protruding from the main section, the side section is located in the cutout and resists against the resisting wall.

12. The portable electronic device of claim 11, wherein the housing comprises a main board and a sidewall protruding from the main board, an opening is defined through the sidewall; and the second elastic member drives the tray out of the housing through the opening.

13. The portable electronic device of claim 12, wherein two fixing blocks protrude from the main board and located between the sidewall and the mounting board, each fixing block defines a first shaft hole; a second shaft hole is defined through the main section; a shaft is retained in the second shaft hole and rotatably extending into the first shaft hole, enabling the triggering member rotating relative to the main board about the shaft.

14. The portable electronic device of claim 13, wherein a triggering hole is defined through the sidewall, a pin is inserted into the triggering hole to drive the triggering member rotate about the shaft so the side section drives the resisting wall and the latching board to move away from the tray, making the latching block is released from the latching groove.

15. A portable electronic device comprising:
a housing defining an opening;
a tray comprising a first end and a second end opposite to the first end, the tray defining a latching groove;
a latching element comprising a latching board, a latching block protruding from the latching board;
a first elastic member being resisted between the latching board and the housing, to make the latching block be latched with the latching groove;
a second elastic member fixed to the housing;

wherein the first end of the tray is located in the opening, the second end of the tray compresses the second elastic member; after the latching block is released from the latching groove, the second elastic member drives the first end of the tray out of the opening.

16. The portable electronic device of claim 15, wherein the latching block protrudes from a surface of the latching board, a slot is defined in another surface of the latching board opposite to the latching block; one end of the first elastic member is received in the slot, and the other end of the first elastic member resists the housing.

17. The portable electronic device of claim 15, wherein a mounting board is fixed to the main board and aligned with the opening; the second elastic member is arcuate and is fixed to a surface of the mounting board facing the opening.

18. The portable electronic device of claim 15, wherein a cutout is defined at one end of the latching board, in which a resisting wall is formed; a triggering member comprising a main section rotatably fixed to the housing and a side section protruding from the main section, the side section is located in the cutout and resists against the resisting wall.

19. The portable electronic device of claim 18, wherein the housing comprises a main board and a sidewall protruding from the main board, an opening is defined through the sidewall; and the second elastic member drives the tray out of the housing through the opening.

20. The portable electronic device of claim 19, wherein two fixing blocks protrude from the main board and are located between the sidewall and the mounting board, each fixing block defines a first shaft hole; a second shaft hole is defined through the main section; a shaft is retained in the second shaft hole and rotatably extending into the first shaft hole, enabling the triggering member rotating relative to the main board about the shaft.

\* \* \* \* \*